United States Patent [19]
Honer

[11] 3,797,283
[45] Mar. 19, 1974

[54] DEVICE FOR LOCKING MOVABLE OBJECTS TO THE GROUND

[76] Inventor: Arthur M. Honer, 111 Redfield Ave., Fayetteville, N.Y. 13066

[22] Filed: Nov. 6, 1972

[21] Appl. No.: 303,789

[52] U.S. Cl. ............................... 70/58, 52/143
[51] Int. Cl. ........................................ E05b 73/00
[58] Field of Search .......... 70/57, 58, 234, 237, 15, 70/18; 52/143, 155, 157, 165; 280/507

[56] References Cited
UNITED STATES PATENTS

| | | | |
|---|---|---|---|
| 3,233,913 | 2/1966 | Brown | 280/507 |
| 3,695,631 | 10/1972 | Schwaiger | 280/507 |
| 3,710,523 | 1/1973 | Taylor | 52/157 |
| 2,706,967 | 4/1955 | Iannetti | 52/155 X |
| 3,739,609 | 6/1973 | Kaufmann | 70/234 |

Primary Examiner—Robert L. Wolfe
Attorney, Agent, or Firm—Salter & Michaelson

[57] ABSTRACT

A device for locking movable objects, such as trailers, campers, or the like, to the ground, comprising a conventional trailer tongue secured to the movable object, said tongue being of the type having socket means for lockingly receiving a ball member attached to the top end of a stake having a pointed and threaded lower end which is securely screwed into the ground, whereby the movable object is locked to the stake by means of the ball and socket connection, the invention further comprising link means interconnecting the stake and the trailer tongue so as to prevent sufficient turning of the stake to permit it to become unscrewed from the ground.

3 Claims, 4 Drawing Figures

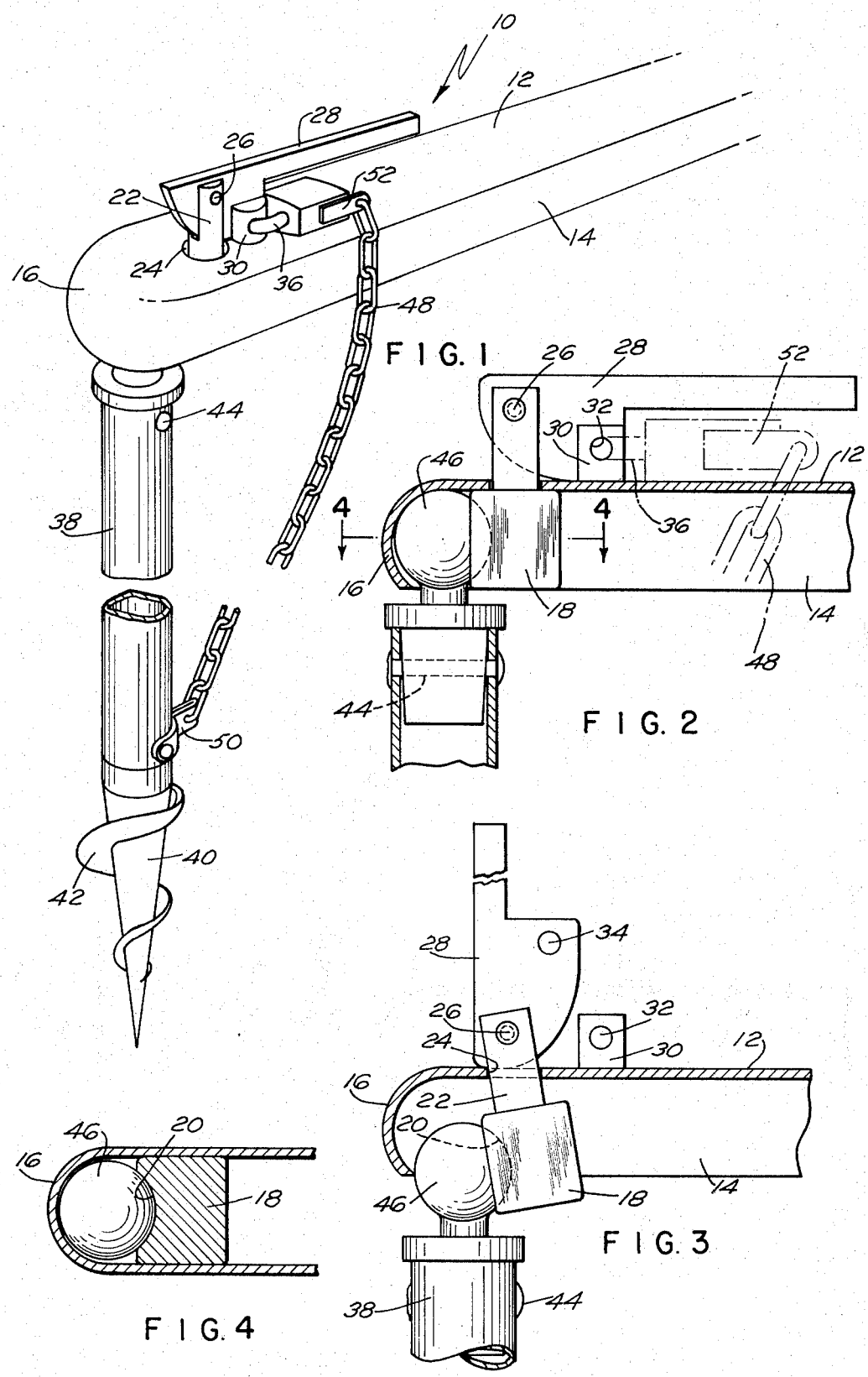

DEVICE FOR LOCKING MOVABLE OBJECTS TO THE GROUND

BACKGROUND AND SUMMARY OF THE INVENTION

This invention relates generally to relatively large transportable objects, such as house trailers, campers, boat trailers and the like. Since objects of this type are normally transported by motor vehicles, they are conventionally provided with trailer tongues having socket means for lockingly receiving a ball member or hitch attached to the motor vehicle, whereby a universal coupling is achieved between the motor vehicle and the trailer.

A problem exists, however, when the trailer is not being transported and has been disconnected or uncoupled from the motor vehicle. In such cases, even though the camper, trailer, or the like is a relatively large object, thefts have nevertheless become an increasing problem. It has therefore been found desirable to provide simple and uncomplicated but yet effective means for locking the trailer, camper or the like to the ground at whatever location is desired. The present invention is directed to the accomplishment of this objective, and specifically provides an earth mount or lock that has been designed so as to cooperate with the conventional trailer tongue on the camper, trailer or the like. More specifically, the present invention generally comprises a rigid stake having a pointed and threaded lower end whereby the stake may be securely threaded or screwed into the ground. At its upper end, the stake is provided with a ball member adapted to cooperate with and be lockingly received by the socket of a conventional trailer tongue carried by the object to be secured. Since, however, the coupling or locking engagement between the ball member and the trailer tongue is a universal-type coupling, it follows that the stake would still normally be free to be rotated so as to unscrew it from the ground, whereupon one desiring to steal the camper, trailer or the like could simply unscrew the stake and then remove the camper with the stake still coupled to the trailer tongue.

In order to preclude this possibility, the present invention has very neatly and simply overcome this problem by providing linkage means interconnecting the stake with the trailer tongue so that when the ball member of the stake is lockingly received by the trailer tongue, the link member will prevent the stake from being rotated sufficiently to permit it to be unscrewed from the ground. In practice, the link member preferably comprises a rugged and durable link chain or cable secured at one end by any suitable means to the stake and secured at its other end to the padlock that is used to lock the movable cam member of the trailer tongue against movement so as to prevent removal of the ball from the socket, all as is well known and conventional in the art. However, by connecting the chain to the padlock, the chain is effectively connected with the trailer tongue when the padlock is locking the latter; and yet, in order to unlock the assembly, it is simply necessary to unlock the padlock, remove it, and then the trailer tongue may be manipulated to release the ball hitch carried by the stake. Convenience is greatly served, however, by the fact that the stake, link chain and padlock all comprise one assembly.

There has therefore been provided, in accordance with the objectives of this invention, a relatively simple, uncomplicated and inexpensive device for effectively locking trailers, campers and the like to the ground at any desired location.

Other objects, features and advantages of the invention will become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view showing the stake member of the present invention in locking relation with a trailer tongue;

FIG. 2 is a fragmentary elevational view, partly in section, showing the means by which the stake is locked to the trailer tongue;

FIG. 3 is a view similar to FIG. 2 but showing the trailer tongue in unlocked position; and FIG. 4 is a section on line 4—4 of FIG. 2.

DESCRIPTION OF THE INVENTION

Referring to the drawings, and more particularly to FIG. 1 thereof, there is shown a generally conventional trailer tongue 10 of durable metallic construction having a top wall 12, sidewalls 14 and a rounded end portion 16. It will be understood that the tongue 10 is securely connected to an object to be transported, such as a trailer, camper or the like (not shown) by any suitable and conventional means. It will further be understood that the tongue 10 is of the type that is adapted to cooperate with a ball hitch carried by a motor vehicle, whereby when the ball hitch is connected to the trailer tongue, a universal coupling exists therebetween which enables the motor vehicle to effectively pull the trailer or camper, all in a well-known manner.

By way of illustration, the trailer tongue 10 may be provided on its top surface 12 with a locking assembly comprising a block 18 which has a concave surface 20 which cooperates with rounded end 16 to provide a socket for lockingly receiving a ball member. More specifically, the block 18 has a bifurcated upper portion 22 that extends through an opening 24 in top wall 12 and pivotally receives, as at 26, a locking cam 28. A pair of spaced brackets 30 are secured to the upper surface 12, said spaced brackets being adapted to receive therebetween the locking cam 28 when the latter is in its locking position, as illustrated in FIGS. 1 and 2. The brackets 30 are provided with aligned openings 32 which align with opening 34 provided in locking cam 28 when the latter is in its locking position so that a padlock, such as shown at 36, may extend through the openings 32 and 34 to lock the locking cam 28 in its downward or locking position. In this position, it will be noted that the block 18 in cooperation with the rounded end 16 provide a rigid socket for lockingly receiving a ball member. When, however, the padlock 36 is unlocked and removed, the locking cam 28 is freed for upward movement to the position illustrated in FIG. 3, in which position the block 18 moves downwardly and rearwardly sufficiently to release the ball member that has been captured in the aforesaid socket. As previously stated, the structure heretofore described is conventional and forms no part of the present invention.

In accordance with the present invention, there has been provided means for locking the trailer tongue 10, and hence the movable object connected to the trailer tongue, such as a trailer, camper or the like, to the ground at any desired location. In accomplishing this objective, there has been provided a rigid and durable stake member 38 having a pointed bottom portion 40 threaded as at 42 to permit the stake to be securely threaded or screwed into the ground. At its upper end the stake 38 has secured thereto, by any suitable means, such as rivet 44, a top assembly comprising a ball member 46 of a size adapted to be snugly received by the aforesaid socket defined by block 18 and end wall portion 16. It will thus be seen that when ball member 46 is received within said socket, and with locking cam 28 locked in its downward or locking position, as illustrated by FIGS. 1 and 2, the trailer tongue 10 is securely locked or coupled to the stake 38. Since, however, the connection between ball member 46 and trailer tongue 10 is a universal connection, it will be obvious that the stake 38 could be readily unscrewed from the ground by one desiring to steal the object carrying the trailer tongue, whereupon the trailer or camper, with the tongue 10 and with the stake 38 assembled thereto, could all be surrepetitiously removed as a unit. In order to prevent this, a rugged and durable flexible chain 48 is secured to the stake 38 above threads 42 by means of any suitable bracket, such as 50, and at its other end the chain 48 is secured to padlock 36, as by bracket 52. Since the chain 48 has limited slack, it will be obvious that said chain will effectively prevent the stake 38 from being twisted or turned sufficiently so as to permit the latter to be unscrewed from the ground. Of course, the free end of chain 48 could be connected to trailer tongue 10 by means other than padlock 36, but this arrangement is preferable, since greater convenience is provided by having the stake 38, chain 48 and padlock 36 as one inseparable unit. Also, it will be understood that the link means 48 could comprise a rugged, high tensile cable rather than the chain illustrated.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a device of the character described, means for locking a movable object such as a trailer, camper or the like to the ground, said means comprising a conventional trailer tongue securely attached to the object, said tongue being of the type having socket means for lockingly receiving a ball member, and further having locking means movable to permit release of the ball member from the socket means, the invention comprising a rigid stake having a pointed and threaded lower end whereby said stake may be securedly screwed into the ground, said stake further having a ball member secured thereto adjacent its upper end, said ball member being adapted to be lockingly received by said trailer tongue, and link means interconnecting said stake and said trailer tongue so as to prevent said stake from being turned sufficiently to become unscrewed from the ground.

2. The device of claim 1 further characterized in that said locking means are normally prevented from movement by means of a padlock, said link means being connected at one of its ends to said padlock and at its other end to said stake.

3. The device of claim 2 further characterized in that said link means is a flexible chain.

* * * * *